(12) United States Patent
Nguyen

(10) Patent No.: US 8,543,397 B1
(45) Date of Patent: Sep. 24, 2013

(54) MOBILE DEVICE VOICE ACTIVATION

(71) Applicant: Hoai Nguyen, Princeton, NJ (US)

(72) Inventor: Hoai Nguyen, Princeton, NJ (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/649,938

(22) Filed: Oct. 11, 2012

(51) Int. Cl.
- G10L 15/26 (2006.01)
- G10L 11/00 (2006.01)
- G10L 21/00 (2013.01)
- G06F 3/16 (2006.01)
- G06F 3/048 (2013.01)

(52) U.S. Cl.
USPC ........... 704/235; 704/270; 704/275; 715/727; 715/769

(58) Field of Classification Search
None
See application file for complete search history.

(56) References Cited

U.S. PATENT DOCUMENTS

| | | | |
|---|---|---|---|
| 4,596,031 A | 6/1986 | Hakaridani et al. | |
| 4,726,065 A | 2/1988 | Froessl | |
| 5,335,276 A * | 8/1994 | Thompson et al. | 380/266 |
| 5,600,765 A | 2/1997 | Ando et al. | |
| 5,749,072 A | 5/1998 | Mazurkiewicz et al. | |
| 5,970,452 A | 10/1999 | Aktas et al. | |
| 6,069,648 A | 5/2000 | Suso et al. | |
| 6,167,374 A | 12/2000 | Shaffer et al. | |
| 6,321,197 B1 | 11/2001 | Kushner et al. | |
| 6,396,477 B1 | 5/2002 | Hinckley et al. | |
| 6,421,672 B1 | 7/2002 | McAllister et al. | |
| 6,539,350 B1 | 3/2003 | Walker | |
| 6,559,830 B1 | 5/2003 | Hinckley et al. | |
| 6,804,653 B2 * | 10/2004 | Gabel | 704/270 |
| 6,813,603 B1 | 11/2004 | Groner et al. | |
| 6,915,258 B2 | 7/2005 | Kontonassios | |
| 7,023,498 B2 * | 4/2006 | Ishihara | 348/734 |
| 7,177,814 B2 | 2/2007 | Gong et al. | |
| 7,287,018 B2 | 10/2007 | Lennon | |
| 7,292,986 B1 | 11/2007 | Venolia et al. | |
| 7,610,199 B2 * | 10/2009 | Abrash et al. | 704/233 |
| 7,904,296 B2 * | 3/2011 | Morris | 704/254 |
| 8,185,392 B1 * | 5/2012 | Strope et al. | 704/252 |
| 8,195,319 B2 * | 6/2012 | Kristjansson et al. | 700/94 |
| 8,224,656 B2 * | 7/2012 | Scholz et al. | 704/276 |
| 8,255,218 B1 | 8/2012 | Cohen et al. | |
| 8,326,636 B2 * | 12/2012 | White | 704/275 |
| 2001/0018653 A1 | 8/2001 | Wutte | |

(Continued)

OTHER PUBLICATIONS

Non-Final Office Action from U.S. Appl. No. 13/251,054, dated Apr. 12, 2013, 30 pp.

(Continued)

Primary Examiner — Brian Albertalli
(74) Attorney, Agent, or Firm — Shumaker & Sieffert, P.A.

(57) ABSTRACT

A mobile computerized device receives an indication of a first user input comprising a button actuation to initiate a push-to-talk voice search. The device receives from the user a spoken search phrase comprising one or more search terms, and receives an indication of a second user input comprising releasing the actuated button which indicates that the user has finished speaking the search phrase. The mobile device generates a search query using the one or more search terms in the spoken search phrase, responsive to receiving the second user input.

In a further example, the computerized mobile device displays one or more likely text search phrases derived from the spoken search phrase via voice-to-text conversion, receives a user input indicating which of the likely text search phrases is an intended search phrase, and uses the intended search phrase as the one or more search terms used in generating the search query.

16 Claims, 5 Drawing Sheets

(56) References Cited

U.S. PATENT DOCUMENTS

| | | | |
|---|---|---|---|
| 2002/0107696 | A1 | 8/2002 | Thomas et al. |
| 2004/0049388 | A1 | 3/2004 | Roth et al. |
| 2004/0073431 | A1 | 4/2004 | Galanes et al. |
| 2004/0230637 | A1 | 11/2004 | Lecoueche et al. |
| 2004/0243415 | A1 | 12/2004 | Commarford et al. |
| 2005/0102146 | A1 | 5/2005 | Lucas et al. |
| 2005/0251746 | A1 | 11/2005 | Basson et al. |
| 2006/0206340 | A1* | 9/2006 | Silvera et al. ............... 704/278 |
| 2006/0247925 | A1 | 11/2006 | Haenel et al. |
| 2007/0124507 | A1 | 5/2007 | Gurram et al. |
| 2008/0134102 | A1 | 6/2008 | Movold et al. |
| 2008/0162143 | A1 | 7/2008 | Agapi et al. |
| 2010/0066684 | A1 | 3/2010 | Shahraray et al. |
| 2010/0105364 | A1* | 4/2010 | Yang ........................ 455/414.1 |
| 2011/0074693 | A1 | 3/2011 | Ranford et al. |
| 2011/0097693 | A1 | 4/2011 | Crawford |
| 2011/0282664 | A1* | 11/2011 | Tanioka et al. ............... 704/235 |
| 2012/0215531 | A1 | 8/2012 | Grobauer et al. |
| 2012/0216134 | A1 | 8/2012 | Neubacher et al. |
| 2012/0260176 | A1 | 10/2012 | Sehrer |
| 2012/0260177 | A1 | 10/2012 | Sehrer |

OTHER PUBLICATIONS

Piannerer, "An Introduction to Speech Recognition," [online]. Mar. 28, 2005. Retrieved from the Internet: <http://www.speech-recognition.de/pdf/introSR.pdf>, 69 pgs.

Rabiner, "A Tutorial on Hidden Markov Models and Selected Applications in Speech Recognition," [online]. Proceedings of the IEEE, vol. 77, No. 2, Feb. 1989. Retrieved from the Internet: <http://www.ece.ucsb.edu/Faculty/Rabiner/ece259/Reprints/tutorial%20on%20hmm%20and%20applications.pdf> 30 pgs.

Rabiner et al., "Speech Recognition: Statistical Methods," [online]. 2006. Retrieved from the Internet: <http://courses.cs.tamu.edu/rgutier/cpsc689_s07/rabinerJuang2006statisticalASRoverview.pdf> 18 pgs.

Stolcke et al., "Recent Innovations in Speech-to-Text Transcription at SRI-ICSI-UW," [online]. IEEE Transactions on Audio, Speech, and Language Processing, vol. 14, No. 5, Sep. 2006. Retrieved from the Internet: <http://www.icsi.berkeley.edu/pubs/speech/UWSRIICSI.pdf> 16 pgs.

"How to Switch or Change Input Method on Android Smart Phone Device," [online]. My Digital Life, Jul. 2, 2010. Retrieved from the Internet: <http://www.mydigitallife.info/2010/07/02/how-to-switch-or-change-input-method-on-android-smart-phone-device/> 7 pgs.

"env touch Voice Recording," [online]. Verizon Wireless Community: Mobile Devices: Cell Phone—General Devices Questions, Oct. 2009. Retrieved from Internet: <http://community.vzw.com/t5/Cell-Phone-General-Devices/env-touch-Voice-Recording/m-p/97326> 2 pgs.

Vertanen et al. "Parakeet: A Continuous Speech Recognition System for Mobile Touch-Screen Devices," IUI'09, Feb. 8-11, 2009. Retrieved from the Internet: <http://www.keithv.com/pub/demoparakeet/demoparakeet.pdf> 10 pgs.

"Voice Recorder Touch | S60 5th Edition Mobiles App," [online]. Symbian Mobile Updates, Apr. 17, 2010. Retrieved from the Internet: <http://symbianpoint.com/voice-recorder-touch-s60-5th-edition-mobiles-app.html> 4 pgs.

"Voice Memos, Go ahead, say what's on your mind," [online]. Apple iPod touch, 2010. Retrieved from the Internet: <http://www.apple.com/ipodtouch/features/voice-memos.html> 2 pgs.

Prosecution history from U.S. Appl. No. 13/083,322, dated Jan. 6, 2012 through Jul. 13, 2012, 60 pp.

Prosecution history from U.S. Appl. No. 13/251,054, dated Jan. 9, 2012 through Nov. 6, 2012, 74 pp.

Responsive amendment filed in U.S. Appl. No. 13/251,054, dated Jul. 12, 2013, 11 pages.

* cited by examiner

MOBILE DEVICE VOICE ACTIVATION

BACKGROUND

A wide variety and large number of applications are available for smartphones, tablets, and other mobile computerized devices. Many smartphones and tablet computers are affiliated with or are capable of connecting to one or more application stores or markets, and often include with several pre-installed applications providing a base set of functions (such as a phone, a camera, a web browser, and a navigation tool).

A user can generally interact with such applications by entering input at a touchscreen overlaying or integrated with a display. For example, a device can detect whether a finger is pressing a fixed-image touchscreen button and/or detect the presence and position of a finger above, near, or on a larger touchscreen display. This functionality enables a user to press virtual or displayed buttons to perform functions such as dialing a telephone number using a phone application, navigating using a Global Positioning System (GPS) application, or entering text using a virtual keyboard (e.g., to compose a message, browse Internet content, etc.).

Some smartphones therefore employ voice search capability, which enables a user to select an entry field such as a text box, touch a button to initiate voice input, speak the desired text phrase, and click an "OK" button upon proper recognition of the voice input. Although this can often be significantly easier than typing a message using a small virtual keyboard on a touchscreen display, it still requires significant touchscreen interaction and attention from a user to complete entry of a text field using voice input. This can be distracting while driving or walking, and involves enough steps that the efficiency gained over text entry using a virtual keyboard may not be significant.

SUMMARY

In one example, a computerized mobile device receives an indication of a first user input comprising a button actuation, the button actuation associated with a voice input operation. A voice input operation is initiated responsive to receiving the first user input, and a user-spoken search phrase comprising one or more search terms is received using the voice input operation. The computerized mobile device receives an indication of a second user input comprising termination of the button actuation, indicating completion of the user-spoken search phrase, and generates a search query using the one or more search terms in the user-spoken search phrase responsive to receiving the indication of the second user input.

In a further example, the computerized mobile device displays one or more likely text search phrases derived from the spoken search phrase via voice-to-text conversion, receives an indication of a user selection input indicating which of the one or more likely text search phrases is an intended search phrase, and uses the intended search phrase as the one or more search terms used in generating the search query.

In another example, a computerized device receives an indication of a first user input comprising a button actuation, wherein the button actuation indicates a user desire to initiate a push-to-talk voice input. The computerized device receives a spoken phrase from the user, and receives a second indication of a user input comprising releasing the actuated button, wherein releasing the actuated button indicates that the user has finished speaking the spoken phrase. An action is performed using the one or more terms in the spoken phrase, responsive to receiving the second user input.

In another example, a computerized mobile device comprises a presence-sensitive display, a processor, and a push-to-talk search module. The computerized mobile device further comprises a microphone operable to receive a user-spoken search phrase comprising one or more search terms upon receiving the first user input. The push-to-talk search module is operable to receive an indication of a first user input comprising a button actuation, the button actuation associated with a voice input operation. The push-to-talk search module is further operable to receive an indication of a second user input comprising termination of the button actuation, indicating completion of the user-spoken search phrase, and is further operable to generate a search query using the one or more search terms in the spoken search phrase, responsive to receiving the second user input.

The details of one or more examples of the invention are set forth in the accompanying drawings and the description below. Other features, objects, and advantages will be apparent from the description and drawings, and from the claims.

DETAILED DESCRIPTION

In the following detailed description of example embodiments, reference is made to specific examples by way of drawings and illustrations. These examples are described in sufficient detail to enable those skilled in the art to practice what is described, and serve to illustrate how these examples may be applied to various purposes or embodiments. Other embodiments exist, and logical, mechanical, electrical, and other changes may be made. Features or limitations of various embodiments described herein, however essential to the example embodiments in which they are incorporated, do not limit other embodiments, and any reference these various examples, their elements, operation, and application do not limit other embodiments but serve only to define these example embodiments. The following detailed description does not, therefore, limit the scope of the various embodiments within the scope of this document.

Mobile electronic devices such as smartphones, tablets, GPS devices, and other such electronic systems often employ touchscreen displays because the display behind the touchscreen can be easily adapted to provide instruction to the user, such that the touchscreen can receive various types of input, thereby providing an intuitive interface that requires very little user training to effectively use. Inexpensive and efficient touchscreen technologies enable incorporation of touchscreens into common consumer electronic devices, and provide a versatile and durable alternative to fixed input keys.

A typical cellular telephone touchscreen display, for example, can be configured to display a traditional "QWERTY" keyboard, and allow a user to type by selectively actuating the touchscreen portion overlaying each key. Similarly, a user can touch icons to select menu items or launch applications, and to perform other such functions. But, a typical adult finger touch is an ellipse that is approximately a third of an inch in its largest dimension, and typing text input on a virtual keyboard on a touchscreen display that may take up a portion of a touchscreen that is perhaps only two by three inches in size can be difficult. Entry of text becomes increasingly problematic if the user is trying to perform another activity at the same time, such as driving or walking.

Some smartphones therefore provide for voice input of text data, using voice recognition or voice-to-text conversion to produce text input from a user's spoken words. This typically involves a smartphone detecting a swipe motion or sequential keyed code to unlock the phone, and receiving additional user input to launch the appropriate application to receive the entered data. The user then finds the desired text entry field, such as a text messaging application, search box in a web browser, or contacts directory to be searched, and selects the text field such as by tapping the field. The mobile device receives the user input, and makes the selected text field the active field for text input. The user then touches a button to initiate voice input, and the mobile device provides a prompt indicating that voice input has been activated. The user then speaks the words intended as input.

The user may then press a button on the device such that the device receives the button actuation to indicate that voice text entry is complete, or the device may determine that the voice text entry is complete after a predetermined period of silence. Listening for silence to determine that voice-based text entry is complete is complicated in many situations by environmental noise, such as people talking on the street or a car radio playing in a car. In some examples, the mobile device receives further user input, such as user actuation of a button, to indicate that the voice input provided has been accurately recognized and is ready to be provided as converted text input to the text field previously selected.

Although such a process involves less typing on the mobile device's touchscreen display than using a virtual keyboard to type a message, it is somewhat involved and includes several different interactions with the device to provide voice-based input.

Figure 1:
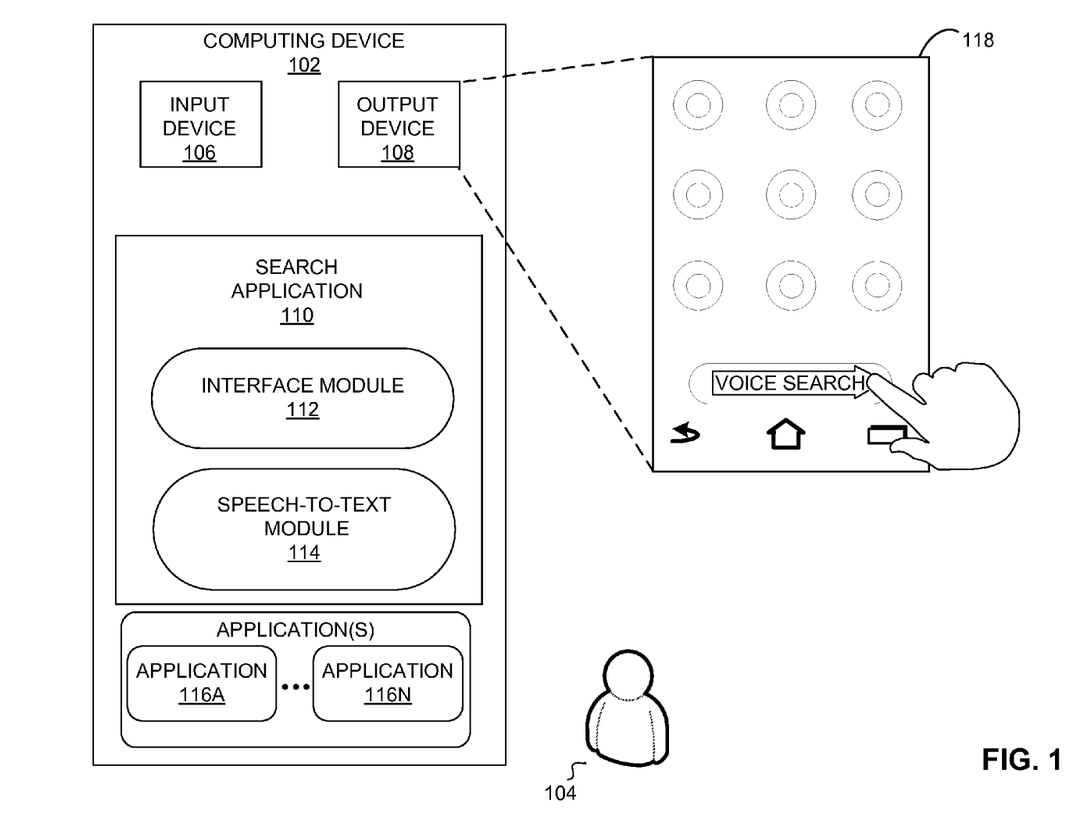
FIG. 1 is a block diagram illustrating a computing device that may be used to provide a push-to-talk mechanism, consistent with an example embodiment.

FIG. 1 is a block diagram illustrating a computing device 102 that may be used to provide a push-to-talk mechanism that activates voice search input, providing for more efficient search term input than can be provided using traditional general-purpose voice input methods on mobile devices, consistent with an example embodiment. In some examples, computing device 102 is associated with user 104. A user associated with a computing device may interact with the computing device by providing various user inputs to the computing device, such as presence-sensitive touchscreen input or other input. In some examples, user 104 may have one or more accounts with one or more services, such as a social networking service and/or telephone service, and the accounts may be registered with computing device 102.

Examples of computing device 102 may include, but are not limited to, portable or mobile devices such as mobile phones (including smartphones), tablet computers, laptop computers, desktop computers, tablet computers, smart television platform, personal digital assistants (PDAs), servers, mainframes, etc. Computing device 102, in some examples, can include one or more input devices 106, and one or more output devices 108. Input devices include in various embodiments user inputs such as presence-sensitive or touchscreen displays, microphones, buttons, keys, and other such input devices. Output devices 108 include user outputs such as speakers, displays, and other such output devices. Other input and output devices include a GPS receiver, a cellular radio modem, Bluetooth, a near-field communication (NFC) radio, and other such devices. Other examples of a computing device 102 that implement function described herein may include additional components not shown in FIG. 1.

Computing device 12 may include various applications, such as a search application 110 and other applications 116A-116N. In some examples, search application 110 is configured to receive position information from a GPS receiver, to receive user input via input devices 106 such as a presence-sensitive touchscreen display, and to provide output via output devices 108 such as a display. Search application 110's interface module 112 interacts with devices such as input device 106, such as a presence-sensitive touchscreen display that can display a graphical user interface and receive input from a user using capacitive or inductive detection at or near the presence-sensitive touchscreen display. Search application 110 further includes a speech-to-text module 114, operable to convert spoken search terms received via an input device such as microphone 106 to text. The spoken terms are in some examples search terms, while in other examples may be other push-to-talk text, such as text message entry using push-to-talk.

As shown in FIG. 1, search application 110 displays via an output device 108 such as a presence-sensitive touchscreen display, a user interface providing for receiving voice input in a mobile device by providing a push-to-talk mechanism that activates voice search input, providing for more efficient search term input than can be provided using traditional general-purpose voice input methods on mobile devices. User selection of where to apply the spoken search term can then be provided by displaying the spoken search terms at a display of the mobile device, and receiving input from a user such as dragging or swiping a representation of the converted text to an icon representing the desired application or database to search, or by receiving other input such as a user touch at an icon from among several icons representing various searchable applications or databases.

In a more detailed example, an input device 106 such as a mechanical button or presence-sensitive screen button area receives a user actuation to activate voice text entry for search, and a microphone is activated to receive a user's spoken desired search terms. When actuation of the button or button area is terminated, the spoken desired search terms are converted to text using a voice recognition algorithm. The button in some examples comprises detecting actuation of a combination of mechanical buttons or presence-sensitive touchscreen area buttons at once to activate the voice text entry tool.

In one such example, actuation of both the volume up and down mechanical buttons on a smartphone at the same time activates the voice text entry search tool, whether the phone is locked or unlocked. In another example, a touchscreen button area providing for fast voice search is provided on the lock screen, and can be accessed easily when the smartphone is locked. The button on the lock screen in another example may be a slider or other input mechanism designed to avoid unintended actuation of the voice-to-text search tool, while still providing for one-step activation of the tool from a lock screen on the mobile device.

Figure 2:
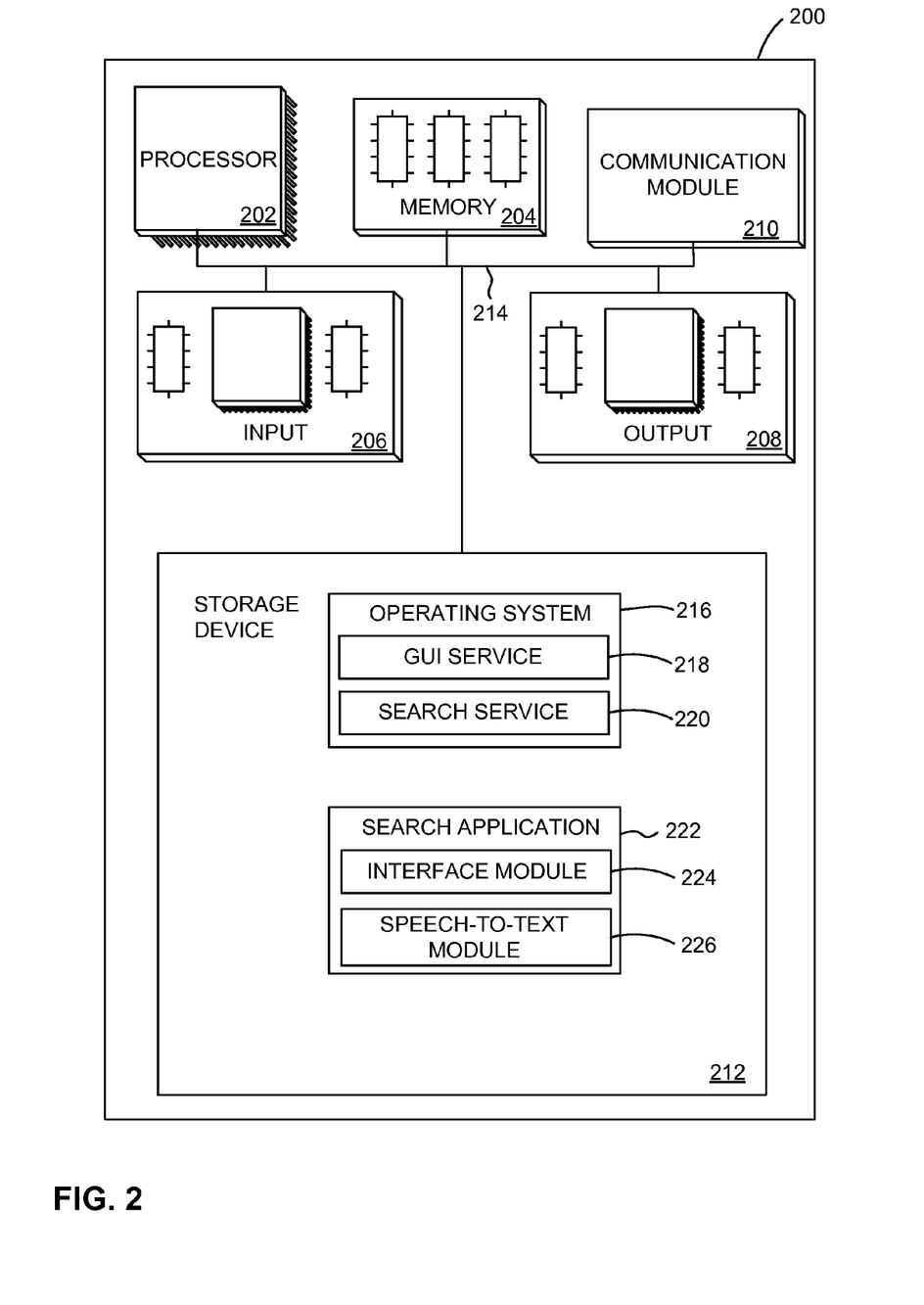
FIG. 2 is a block diagram illustrating further details of one example of a computing device shown in FIG. 1, consistent with an example embodiment.

FIG. 2 is a block diagram illustrating further details of one example of a computing device shown in FIG. 1. FIG. 2 illustrates only one particular example of computing device 200, and many other examples of computing device 200 may be used in other examples.

As shown in the specific example of FIG. 2, computing device 200 includes one or more processors 202, memory 204, one or more input devices 206, one or more output devices 208, one or more communication modules 210, and one or more storage devices 212. Computing device 200, in one example, further includes an operating system 216 executable by computing device 200. The operating system includes in various examples services such as a graphical user interface service 218 and a search service 220. One or more applications, such as search application 222 are also stored on storage device 212, and are executable by computing device 200. Each of components 202, 204, 206, 208, 210, and 212 may be interconnected (physically, communicatively, and/or operatively) for inter-component communications, such as via one or more communications channels 214. In some examples, communication channels 214 may include a system bus, network connection, interprocess communication data structure, or any other channel for communicating data. Applications such as 222 and operating system 216 may also communicate information with one another as well as with other components in computing device 200.

Processors 202, in one example, are configured to implement functionality and/or process instructions for execution within computing device 200. For example, processors 202 may be capable of processing instructions stored in storage device 212. Examples of processors 202 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 212 may be configured to store information within computing device 200 during operation. Storage device 212, in some examples, is described as a computer-readable storage medium. In some examples, storage device 212 is a temporary memory, meaning that a primary purpose of storage device 212 is not long-term storage. Storage device 212, in some examples, is described as a volatile memory, meaning that storage device 212 does not maintain stored contents when the computer is turned off. In other examples, data is loaded from storage device 212 into memory 204 during operation. Examples of volatile memories include random access memories (RAM), dynamic random access memories (DRAM), static random access memories (SRAM), and other forms of volatile memories known in the art. In some examples, storage device 212 is used to store program instructions for execution by processors 202. Storage device 212 and memory 204, in various examples, are used by software or applications running on computing device 200 (e.g., applications 222) to temporarily store information during program execution.

Storage devices 212, in some examples, also include one or more computer-readable storage media. Storage devices 212 may be configured to store larger amounts of information than volatile memory. Storage devices 212 may further be configured for long-term storage of information. In some examples, storage devices 212 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 200, in some examples, also includes one or more communication units 210. Computing device 200, in one example, utilizes communication unit 210 to communicate with external devices via one or more networks, such as one or more wireless networks. Communication unit 210 may be a network interface card, such as an Ethernet card, an optical transceiver, a radio frequency transceiver, or any other type of device that can send and/or receive information. Other examples of such network interfaces may include Bluetooth, 3G and WiFi radios computing devices as well as Universal Serial Bus (USB). In some examples, computing device 200 utilizes communication unit 210 to wirelessly communicate with an external device such as computing devices 102 of FIG. 1, or any other computing device.

Computing device 200, in one example, also includes one or more input devices 206. Input device 206, in some examples, is configured to receive input from a user through tactile, audio, or video feedback. Examples of input device 206 include a presence-sensitive touchscreen display, a mouse, a keyboard, a voice responsive system, video camera, microphone or any other type of device for detecting input from a user. In some examples, a presence-sensitive display includes a touch-sensitive screen commonly known as a touchscreen.

One or more output devices 208 may also be included in computing device 200. Output device 208, in some examples, is configured to provide output to a user using tactile, audio, or video stimuli. Output device 208, in one example, includes a presence-sensitive touchscreen display, a sound card, a video graphics adapter card, or any other type of device for converting a signal into an appropriate form understandable to humans or machines. Additional examples of output device 208 include a speaker, a light-emitting diode (LED) display, a liquid crystal display (LCD), or any other type of device that can generate output to a user. In some examples, input device 206 and/or output device 208 are used to provide operating system services, such as graphical user interface service 218, such as via a presence-sensitive touchscreen display.

Computing device 200 may include operating system 216. Operating system 216, in some examples, controls the operation of components of computing device 200, and provides an interface from various applications such as 222 to components of computing device 200. For example, operating system 216, in one example, facilitates the communication of application 222 with processors 202, communication unit 210, storage device 212, input device 206, and output device 208. As shown in FIG. 2, application 222 may include search application 110, as described in FIG. 1. Applications such as 222 may each include program instructions and/or data that are executable by computing device 200. As one example, search application 222 and its interface modules 224 and speech-to-text modules 226 may include instructions that cause computing device 200 to perform one or more of the operations and actions described in the present disclosure.

The methods described herein may be implemented, at least in part, in hardware, software, firmware, or any combination thereof. For example, the described methods may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the methods described herein.

Such hardware, software, and firmware may be implemented within the same device or within separate devices to support the various methods described herein. In addition, any of the described units, modules or components may be implemented together or separately as discrete but interoperable logic devices. Depiction of different features as modules or units is intended to highlight different functionality and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The methods described herein may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in memory or nonvolatile memory).

Figure 3:
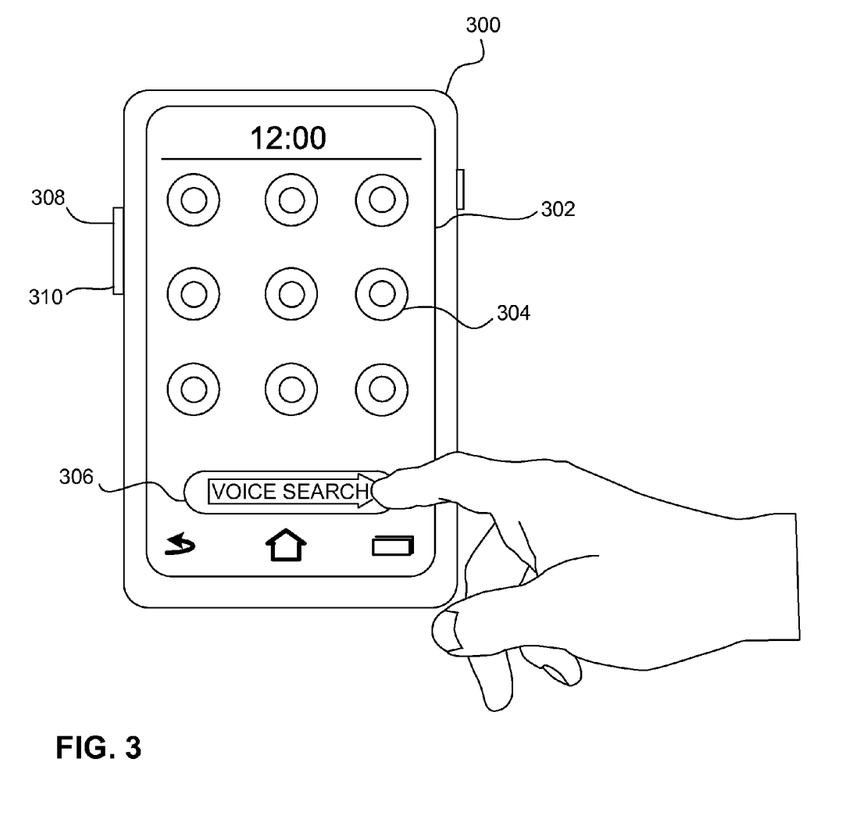
FIG. 3 shows a mobile device including push-to-talk voice search functionality, consistent with an example embodiment.

FIG. 3 shows a mobile device including push-to-talk voice search functionality, consistent with an example. Here, a mobile computing device such as a smartphone 300 includes a presence-sensitive touchscreen display 302, which in this example reflects a locked state. The locked display image here includes a clock that displays the time, as well as nine buttons arranged in a square configuration with a button in the middle of the square. The smartphone unlocks upon receiving input such as a user drawing a preconfigured pattern linking the dots 304 to one another. This both prevents inadvertent use of the phone, and provides some data security for the phone's owner. In another example, the device unlocks upon input of a password such as a number entered using a numeric keypad.

Even with a locked phone, certain functions may remain available, such as the ability to make calls or to take a photo. In this example, the smartphone remains available to perform a voice-based search, and enters a voice input mode upon detection of a swipe motion across voice search swipe bar 306. The smartphone then receives spoken words that are to be searched via a microphone, until the user removes the finger used to provide the swipe input from the end of the voice search swipe bar. In an alternate embodiment, the voice search may not be initiated until the phone is unlocked, or the smartphone may limit search to certain applications or databases if the phone is locked.

In an alternate embodiment, the smartphone 300 receives input through physical buttons to initiate a voice-based search, such as detecting actuation of both a volume up button 308 and a volume down button 310 at the same time. Actuating the voice-based search in this example may be done using physical buttons when the phone is in the locked or unlocked state, but in other embodiments may be available only when unlocked, or only when locked. Here, the smartphone detects actuation of volume up button 308 and volume down button 310 at the same time, and receives the spoken search terms until at least one of the buttons is released, indicating that voice input is complete.

In a more detailed example, the smartphone 300 detects at the presence-sensitive touchscreen display 300 a first user input comprising either simultaneous actuation of buttons 308 and 310 or a swipe across swipe bar 306, such as via FIG. 2's operating system 216's graphical user interface service 219 or search application 222's interface module 224. The mobile device initiates a voice input operation as a result of receiving the input, and receives voice input such as through a microphone input device 206. When the user releases the swipe bar 306 or at least one of buttons 308 and 310, the spoken search input is complete and the smartphone 300 stops receiving voice input. The smartphone's search application 222 then uses speech-to-text module 226 to convert the spoken word or phrase to text, and performs a search using the text search terms via the operating system 216's search service 220.

Figure 4:
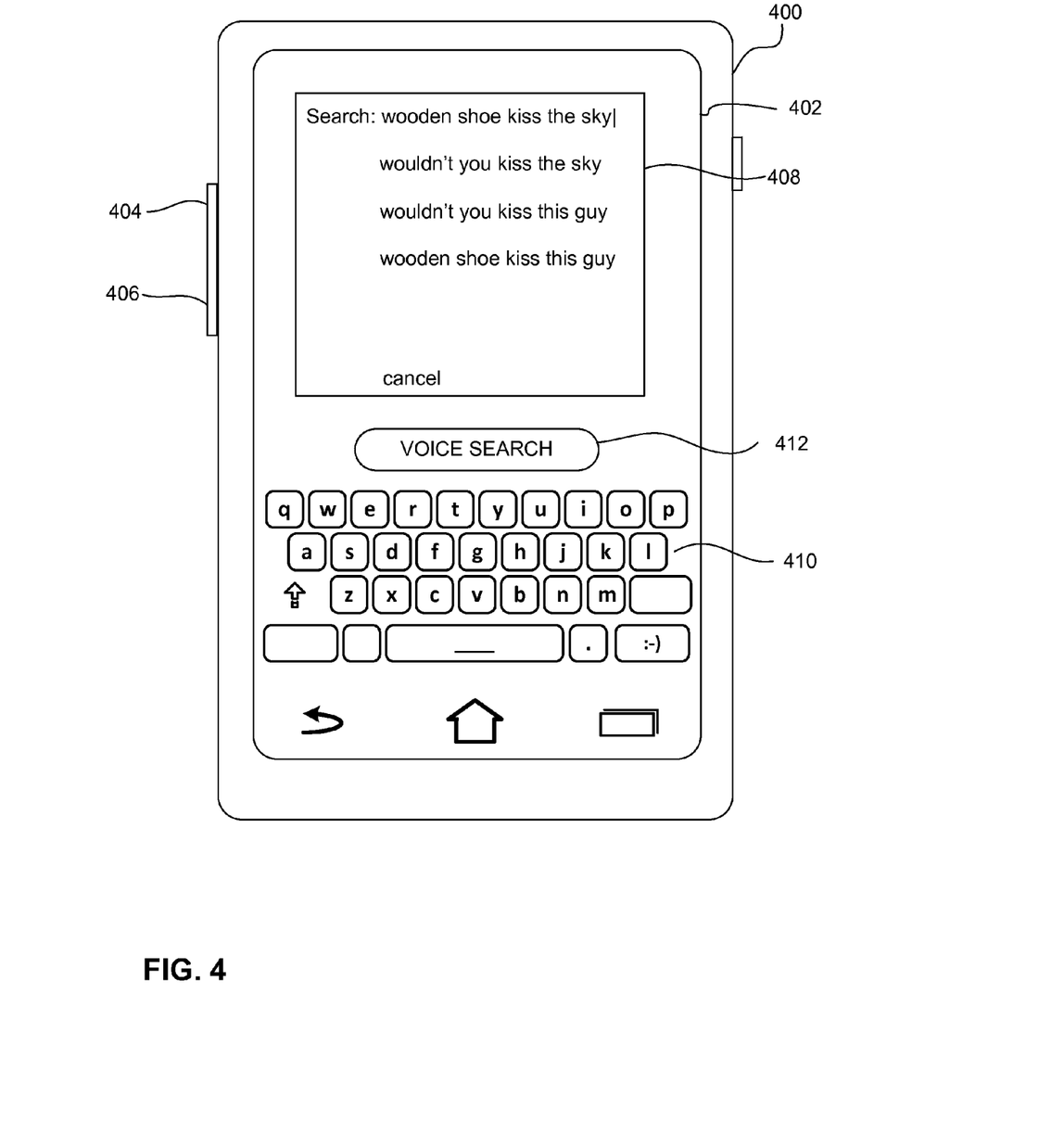
FIG. 4 shows a mobile device that provides push-to-talk voice search, consistent with an example embodiment.

FIG. 4 shows a mobile device that provides push-to-talk voice search, consistent with an example embodiment. Here, mobile device 400 comprises a smart phone, but in other embodiments may be a tablet computer, Personal Digital Assistant (PDA), e-reader, or other device. The mobile device includes a presence-sensitive touchscreen display 402, and volume up button 404 and volume down button 406.

The mobile device receives user input selecting a search text entry field shown at display 408 into which one or more search terms are to be entered, but in an alternate embodiment will perform another action to initiate a search, resulting in presentation of a search entry screen such as that shown on the touchscreen display at 402. The mobile device can receive search terms using a keyboard 410 presented via the presence-sensitive touchscreen display of the mobile device, but as was previously discussed this can be undesirable for several reasons.

Typing search terms via a keyboard can be difficult in that it often requires two hands to perform efficiently, such as by supporting the mobile device with one hand while typing with the other, or cradling the mobile device in one's fingers while typing with the thumbs of both hands. Entering text while performing other actions such as driving can therefore be difficult or dangerous. Also, the relatively small size of each key on the presence-sensitive touchscreen keyboard 410 can make typing slow and error-prone, given that the total width of a typical keyboard such as that shown at 410 may be only a couple inches, while a finger touch is typically approximately one-third of an inch across and the exact location of touch is obscured by the rest of the user's finger.

Mobile device 400 therefore provides voice search button 412, which when actuated provides voice search term input in a push-to-talk fashion. That is, when the mobile device detects actuation of touchscreen voice search button 412, the mobile device receives voice input through a microphone and converts it to search terms. The mobile device stops receiving voice input for conversion when the button is released, much as a push-to-talk button on a two-way radio or intercom transmits voice only while a "talk" button is held down.

In an alternate embodiment, the mobile device detects actuation of one or more physical buttons rather than a virtual or touchscreen display button area to activate push-to-talk voice entry of search terms, such as simultaneous actuation of both the volume up button 404 and volume down button 406. This is desirable in some embodiments as the physical buttons provide tactile feedback to the user, and can be used to not only enter voice search terms but can initiate push-to-talk voice-based search. The mobile device receives voice input while the buttons are held down, and stops receiving voice input for search terms when the buttons are released. In the volume buttons example, holding down both buttons simultaneously provides an easy mechanism for the user to initiate and provide voice input for search, without requiring additional hardware not already commonly provided on mobile devices such as smartphones and tablet computers.

Using a push-to-talk button to provide search terms or other text input provides the added benefit of a well-defined start and stop time for the spoken search terms, simplifying the task of determining what sounds are spoken words that are to be a part of the search phrase. For example, a user on a busy sidewalk may wish to search for directions to a restaurant, and use voice-based search rather than try to type while walking. Simply using voice recognition with automatic detection of the end of a spoken phrase by listening for a period of silence may be ineffective in such an environment, where ambient noise including other people speaking may prevent automatic detection of the end of a spoken phrase.

In a further example, the mobile device 400 recognizes spoken search terms either as the user speaks or once the user's speaking is complete, and a list of one or more voice-to-text converted search phrases is presented to the user for selection and search. Referring again to FIG. 4, the user holds down either the voice search touchscreen button 412 or the up volume button 404 and down volume button 406 while speaking the phrase "wouldn't you kiss this guy." A voice-to-text module within the mobile device 400 receives a digitized version of the voice signal through a microphone, and converts the spoken phrase to one or more likely search terms or phrases. The mobile device 400 displays the one or more likely search terms to the users as shown at display 408, such that the user may read the suggested phrases or terms, and choose from among them by tapping a displayed representation of the correct phrase at display 408 with a finger.

In an alternate embodiment, the mobile device 400 detects either of the user releasing the voice search touchscreen button area 412 to end voice-based search term entry and a separate touch action to indicate selection of the desired phrase, or detects a finger drag or swipe from the voice search button 412 to the desired phrase presented on the display. In a further example, the mobile device is operable to detect a phrase that is repeated while the voice search button or buttons are actuated, and provides new or additional suggested phrases or terms in the search text entry field at display 408. If the mobile device detects that the voice search button is released and held down again without selection of a suggested search phrase, new or additional suggested phrases or terms are also provided in the search text entry field 408.

Figure 5:
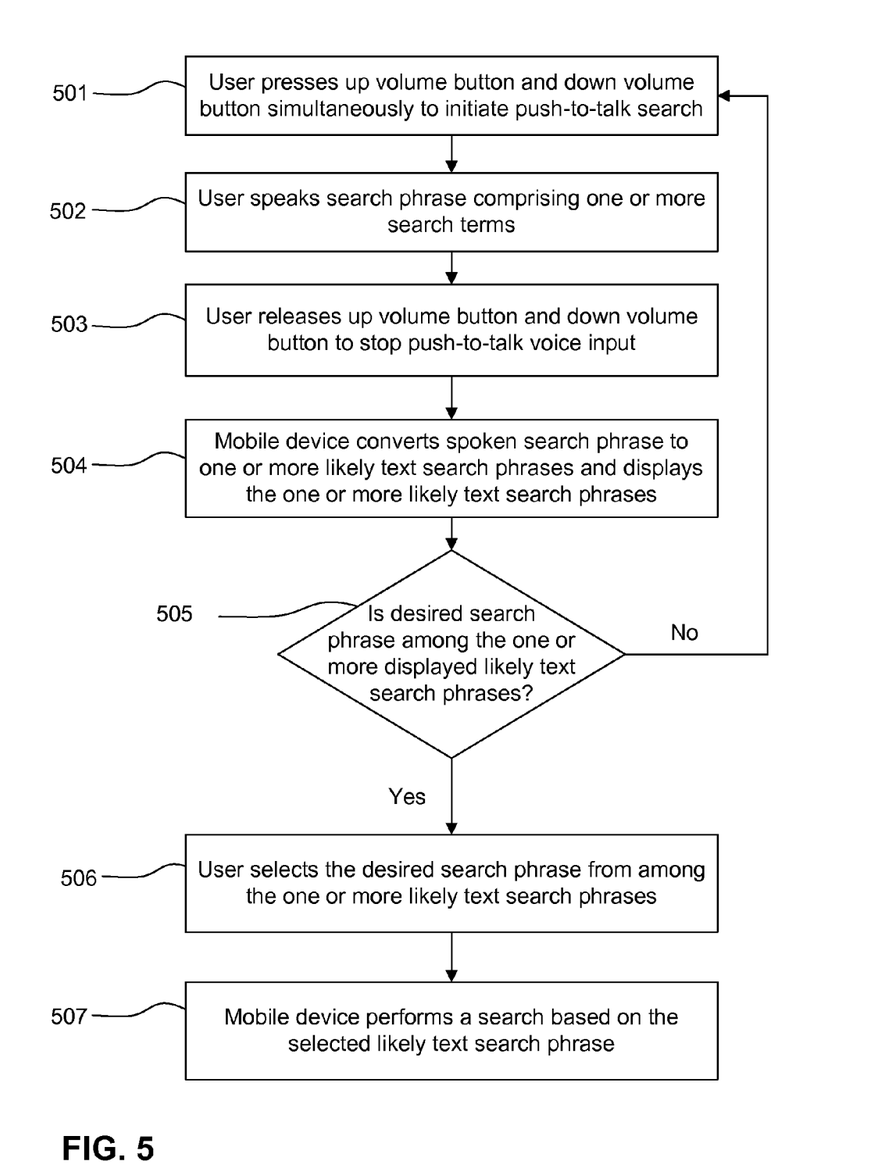
FIG. 5 is a flowchart illustrating a method of performing push-to-talk voice search using a mobile device, consistent with an example embodiment.

FIG. 5 is a flowchart illustrating a method of performing push-to-talk voice search using a mobile device, consistent with an example embodiment. The example method of FIG. 5 may be performed by a mobile computing device, such as computing device 102 of FIG. 1 or mobile device 200 of FIG. 2. At 501, a mobile device such as a smartphone detects simultaneous actuation of an up volume button and down volume button on the side of the device. This triggers initiation of push-to-talk search, causing the smartphone to listen for spoken words from the user using an attached microphone.

The mobile device detects a spoken search phrase at 502 which comprises one or more words or search terms, such as by receiving a speech signal via a microphone, digitizing the received speech signal, and converting the digitized speech signal to text. In a further example, the mobile device stores the digitized speech for speech-to-text conversion, such as by storing the speech in a computer-readable storage medium such as dynamic random access memory (DRAM) of the mobile device. In an alternate embodiment, the speech is provided to an external computerized system for speech-to-text conversion, such as a server communicatively coupled to the wireless device.

The mobile device then detects release of at least one of the up volume button and down volume button at 503, stopping the push-to-talk voice input of search terms. The mobile device stops listening for search terms once the volume buttons are no longer simultaneously pressed, and at 504 converts the spoken search phrase to one or more likely text search phrases by voice-to-text conversion. In further embodiments, additional tools such as comparing the voice-to-text conversion results to actual likely search phrases using a search engine or other such resource are employed to provide more likely text search phrases as a result of the voice-to-text conversion.

The mobile device displays the one or more likely text search phrases at 504, and the user views the displayed likely text search phrases at 505 to determine whether the desired search phrase is among the one or more displayed likely text search phrases. If the desired search phrase is not among the one or more displayed likely text search phrases, the user presses the up volume button and down volume button at 501, such that the mobile device receives the input initiating a new voice search and begins a new voice search at 501. In an alternate embodiment, the mobile device receives an input such as actuation of a button or combination of buttons to cause the mobile device to retrieve more or different likely text search phrases for display.

If the desired search phrase is among the one or more displayed likely text search phrases at 505, and the user selects the desired search phrase from among the one or more likely text search phrases displayed, the mobile device receives such input from the user such as by detecting a touch at an area associated with the displayed phrase on the mobile device's presence-sensitive touchscreen display or by detecting a finger dragged or swiped from a displayed voice search button area to a desired text search phrase area. The mobile device receives this user input, and performs a search based on the selected likely text search phrase. In some embodiments this search comprises searching locally stored information, such as documents, contact lists, applications, or other information. In other examples, the search comprises sending the selected likely text search phrase to a remote search engine or other server, which in response provides search results to the mobile device. Still other embodiments will search both local information and remote information.

In a further example, the results are not displayed immediately if the device is in a locked state, but are viewable only after a user unlocks the mobile device, such as by entering an unlock code, performing a swipe pattern, or performing another unlock action. The device therefore can perform a search while in the locked state, such as a push-to-talk search as described above, and unlocks the mobile device to display the results of the search.

The systems and methods describe here are suitable not only for devices such as the mobile devices shown in FIGS. 1-4, but may be adapted to other mobile devices such as tablet computers, remote controls, video game controllers, and other such computerized mobile devices.

The examples described herein may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the examples described herein.

Such hardware, software, and firmware may be implemented within the same device or within separate devices to support the various examples. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The examples described herein may also be embodied or encoded in an article of manufacture, including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in random access memory or flash memory).

The examples presented here illustrate how push-to-talk voice input can be used to provide more efficient input in a mobile computing device. Although specific embodiments have been illustrated and described herein, it will be appreciated by those of ordinary skill in the art that any arrangement that achieve the same purpose, structure, or function may be substituted for the specific embodiments shown. This application is intended to cover any adaptations or variations of the embodiments described herein.

The invention claimed is:

1. A method, comprising:
    receiving, by a mobile computing device, an indication of a first user input comprising actuation of a graphical element, the actuation being associated with a voice input operation, the first user input being detected at a presence-sensitive display;
    responsive to receiving the indication of the first user input and prior to a termination of the actuation:
        initiating, by the mobile computing device, the voice input operation;
        receiving, by the mobile computing device using the voice input operation, a user-spoken search phrase comprising one or more search terms;
        outputting, by the mobile computing device and for display, one or more candidate text search phrases determined based at least in part on the user-spoken search phrase;
        receiving, by the mobile computing device, an indication of a gesture sliding from a first area of the presence-sensitive display associated with the one or more candidate text search phrases to a second area of the presence-sensitive display associated with an icon for an application;
        receiving, by the mobile computing device, an indication of a second user input, the second user input indicating the termination of the actuation, wherein the second user input indicates a completion of the user-spoken search phrase; and
    responsive to receiving the indication of the second user input, generating, by the mobile computing device and based on the user-spoken search phrase, a search query for the application to identify content associated with the one or more search terms.

2. The method of claim 1, wherein receiving the indication of the first user input comprising the actuation of the graphical element comprises receiving a user actuation input at an area of the presence-sensitive display associated with graphical element displayed at the presence-sensitive display.

3. The method of claim 2, wherein the termination of the actuation of the graphical element comprises a termination of the received user actuation input at the area of the presence-sensitive display associated with the graphical element displayed at the presence-sensitive display.

4. The method of claim 1, further comprising receiving a third user input indicating which of the one or more candidate text search phrases is an intended search phrase, and using the intended search phrase as the one or more search terms used in performing a search based on the search query.

5. The method of claim 4, wherein receiving the third user input indicating which of the one or more candidate text search phrases is an intended search phrase comprises receiving an indication of a touch at an area of the intended search phrase displayed on the presence-sensitive display.

6. The method of claim 4, wherein receiving the third user input indicating which of the one or more candidate text search phrases is an intended search phrase comprises receiving an indication of a user finger sliding from an area of a presence-sensitive display actuated to provide the first user input to the area of the intended search phrase displayed on the presence-sensitive display.

7. The method of claim 1, further comprising using the generated search query to search the one or more search terms in data local to the mobile computing device.

8. The method of claim 1, further comprising sending the generated search query to a remote server operable to search data remote from the mobile computing device.

9. A method, comprising:
    receiving, by a mobile computing device, an indication of a first user input comprising actuation of a graphical element, the actuation initiating a push-to-talk voice input operation, the first user input being detected at a presence-sensitive display;
    receiving, the mobile computing device and from the user, an indication of a spoken phrase comprising one or more terms;

outputting, by the mobile computing device and for display, one or more candidate text search phrases determined based at least in part on the spoken phrase;

receiving, by the mobile computing device, an indication of a gesture sliding from a first area of the presence-sensitive display associated with the one or more candidate text search phrases to a second area of the presence-sensitive display associated with at least one icon;

receiving, by the mobile computing device, an indication of a second user input that terminates the push-to-talk voice input, wherein terminating the push-to-talk voice input indicates that the user has finished speaking the spoken phrase; and responsive to receiving the indication of the second user input, performing, by the computing device, an action associated with the at least one icon using the one or more terms in the spoken phrase.

10. The method of claim 9, wherein the action comprises one of performing a search, composing a text message, and or composing an email message.

11. A computerized mobile device, comprising
at least one processor that is operable to:
receive an indication of a first user input comprising actuation of a graphical element, the actuation associated with a voice input operation, the first user input being detected at a presence-sensitive display;
responsive to receiving the indication of the first user input and prior to a termination of the button actuation:
initiate the voice input operation;
receive an indication of a user-spoken search phrase comprising one or more search terms upon receiving the first user input;
output for display, the one or more candidate text search phrases based at least in part on the user-spoken search phrase;
receive an indication of a gesture sliding from a first area of the presence-sensitive display associated with the one or more candidate text search phrases to a second area of the presence-sensitive display associated with at least one icon for an application;
receive an indication of a second user input comprising termination of the actuation, indicating completion of the user-spoken search phrase; and
responsive to the receiving the indication of the second user input, generate, and based on the user-spoken search phrase, a search query for the at least one of the application to identify content associated with the one or more search terms.

12. The computerized mobile device of claim 11, wherein the receiving the indication of the first user input comprising the actuation comprises receiving an indication of a user actuation input at an area of the presence-sensitive display associated with the graphical element displayed at the presence-sensitive display, and termination of the actuation comprises receiving an indication of termination of the received user actuation input at the area of presence-sensitive display associated with the graphical element displayed at the presence-sensitive display.

13. The computerized mobile device of claim 11, further comprising at least one of using the generated search query to search the one or more search terms in data local to the computerized mobile device or sending the generated search query to a remote server operable to search data remote from the computerized mobile device.

14. A machine-readable storage device with instruction stored thereon, the instructions when executed operable to cause a computerized mobile device to:
receive an indication of a first user input comprising an actuation of a graphical element, the actuation being associated with a voice input operation, the first user input being detected at a presence-sensitive display;
responsive to receiving the indication of the first user input and prior to a termination of the actuation:
initiate the voice input operation;
receive, using the voice input operation, an indication of a user-spoken search phrase comprising one or more search terms;
output for display, the one or more candidate text search phrases determined based at least in part on the spoken phrase;
receive an indication of a gesture sliding from a first area of a presence-sensitive display associated with the one or more candidate text search phrases to a second area of the presence-sensitive display associated with at least one icon;
receive an indication of a second user input indicating the termination of the actuation, wherein the second user input indicates a completion of the user-spoken search phrase; and
responsive to receiving the indication of the second user inputs perform an action associated with the at least one icon using the one or more terms in the spoken phrase.

15. The machine-readable medium of claim 14, wherein the action comprises one of performing a search, composing a text message, and composing an email message.

16. The machine-readable medium of claim 14, the instructions when executed further operable to cause the computerized mobile device to:
output for display one or more candidate text phrases derived from the spoken search phrase;
receive an indication of a third user input indicating which of the one or more candidate text phrases is an intended phrase; and
perform the action using the intended phrase.

* * * * *